United States Patent
Ramirez et al.

(10) Patent No.: US 12,221,797 B2
(45) Date of Patent: Feb. 11, 2025

(54) FIBER-REINFORCED POLYMER ANCHORING SYSTEM

(71) Applicant: DUKTIL FRP LLC, San Dieigo, CA (US)

(72) Inventors: Jesus Javier Ramirez, San Diego, CA (US); Victor Reyes, San Diego, CA (US)

(73) Assignee: DUKTIL FRP LLC

( * ) Notice: Subject to any disclaimer, the term of this patent is extended or adjusted under 35 U.S.C. 154(b) by 214 days.

(21) Appl. No.: 18/107,470

(22) Filed: Feb. 8, 2023

(65) Prior Publication Data

US 2023/0250655 A1 Aug. 10, 2023

Related U.S. Application Data

(60) Provisional application No. 63/308,129, filed on Feb. 9, 2022.

(51) Int. Cl.
*E04G 23/02* (2006.01)
*B32B 7/12* (2006.01)
*B32B 15/08* (2006.01)

(52) U.S. Cl.
CPC ............ *E04G 23/0218* (2013.01); *B32B 7/12* (2013.01); *B32B 15/08* (2013.01); *B32B 2419/00* (2013.01); *E04G 2023/0262* (2013.01)

(58) Field of Classification Search
CPC ........ E04G 23/0218; E04G 2023/0262; E04G 2023/0251; E04G 2023/020255; E04G 2023/0259; E04G 23/0244; B32B 7/12; B32B 15/08; B32B 2419/00
See application file for complete search history.

(56) References Cited

U.S. PATENT DOCUMENTS

| | | | | |
|---|---|---|---|---|
| 5,640,825 A * | 6/1997 | Ehsani | ................ | E04G 23/0218 52/746.1 |
| 6,145,260 A * | 11/2000 | Morton | ............... | E04G 23/0218 52/746.1 |
| 6,389,775 B1 * | 5/2002 | Steiner | ................ | E04G 23/0218 52/422 |
| 6,418,684 B1 * | 7/2002 | Morton | ............... | E04G 23/0218 52/309.1 |
| 6,584,738 B1 * | 7/2003 | Andra | ................... | E04G 21/121 52/223.13 |
| 6,851,232 B1 * | 2/2005 | Schwegler | .......... | E04G 23/0218 156/254 |

(Continued)

FOREIGN PATENT DOCUMENTS

| | | | | |
|---|---|---|---|---|
| EP | 1033455 A1 * | 9/2000 | ......... | E04G 23/0218 |
| EP | 2083133 A2 * | 7/2009 | ......... | E04G 23/0218 |

(Continued)

*Primary Examiner* — Adriana Figueroa
(74) *Attorney, Agent, or Firm* — Ying-Ting Chen

(57) ABSTRACT

A fiber-reinforced polymer anchoring system for a structural element includes a fiber-reinforced polymer member configured to provide external tensile reinforcement to the structural element; an anchoring device coupled with the fiber-reinforced polymer member and the structural element; wherein the anchoring device includes a metallic layer, a fiber-reinforced polymer layer, and a fastener for securing the anchoring device on the fiber-reinforced polymer member and the structural element.

20 Claims, 6 Drawing Sheets

(56) References Cited

U.S. PATENT DOCUMENTS

| | | | | |
|---|---|---|---|---|
| 6,907,697 | B2* | 6/2005 | Gergely | E02D 27/01 |
| | | | | 52/703 |
| 7,296,385 | B2* | 11/2007 | Andra | E04C 5/127 |
| | | | | 52/223.13 |
| 8,578,670 | B2* | 11/2013 | Wu | E04G 23/0218 |
| | | | | 52/231 |
| 9,010,047 | B2* | 4/2015 | Wu | E04G 23/0218 |
| | | | | 52/223.1 |
| 9,290,957 | B1* | 3/2016 | Wheatley | E04G 23/0229 |
| 10,323,427 | B2* | 6/2019 | Schmidt | E04C 5/127 |
| 10,858,850 | B2* | 12/2020 | Wheatley | E04G 23/0218 |
| 11,802,415 | B2* | 10/2023 | Ramirez | E04C 5/073 |
| 2021/0123253 | A1* | 4/2021 | Wheatley | E04G 23/0229 |

FOREIGN PATENT DOCUMENTS

| | | | | | |
|---|---|---|---|---|---|
| JP | 10121745 | A | * | 5/1998 | |
| JP | 2002285460 | A | * | 10/2002 | |
| JP | 2002285461 | A | * | 10/2002 | |
| KR | 20020053897 | A | * | 7/2002 | |
| KR | 20040077631 | A | * | 9/2004 | |
| KR | 20060073012 | A | * | 6/2006 | |
| KR | 20080015306 | A | * | 2/2008 | |
| KR | 20080111664 | A | * | 12/2008 | |
| WO | WO-2004038129 | A1 | * | 5/2004 | E04G 23/0218 |
| WO | WO-2013113442 | A1 | * | 8/2013 | E04G 23/0218 |

* cited by examiner

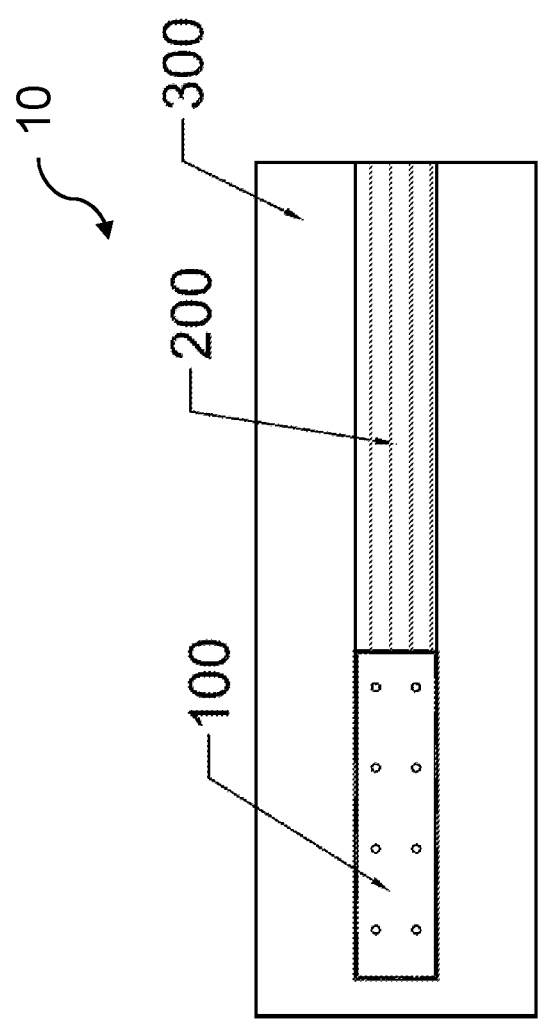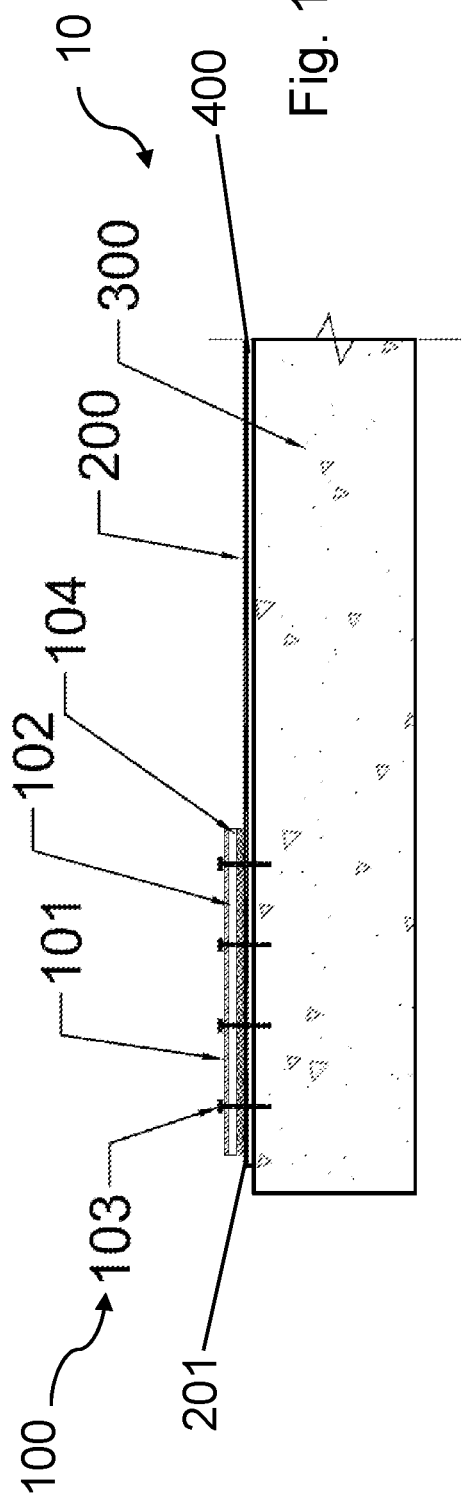
Fig. 1A
Fig. 1B

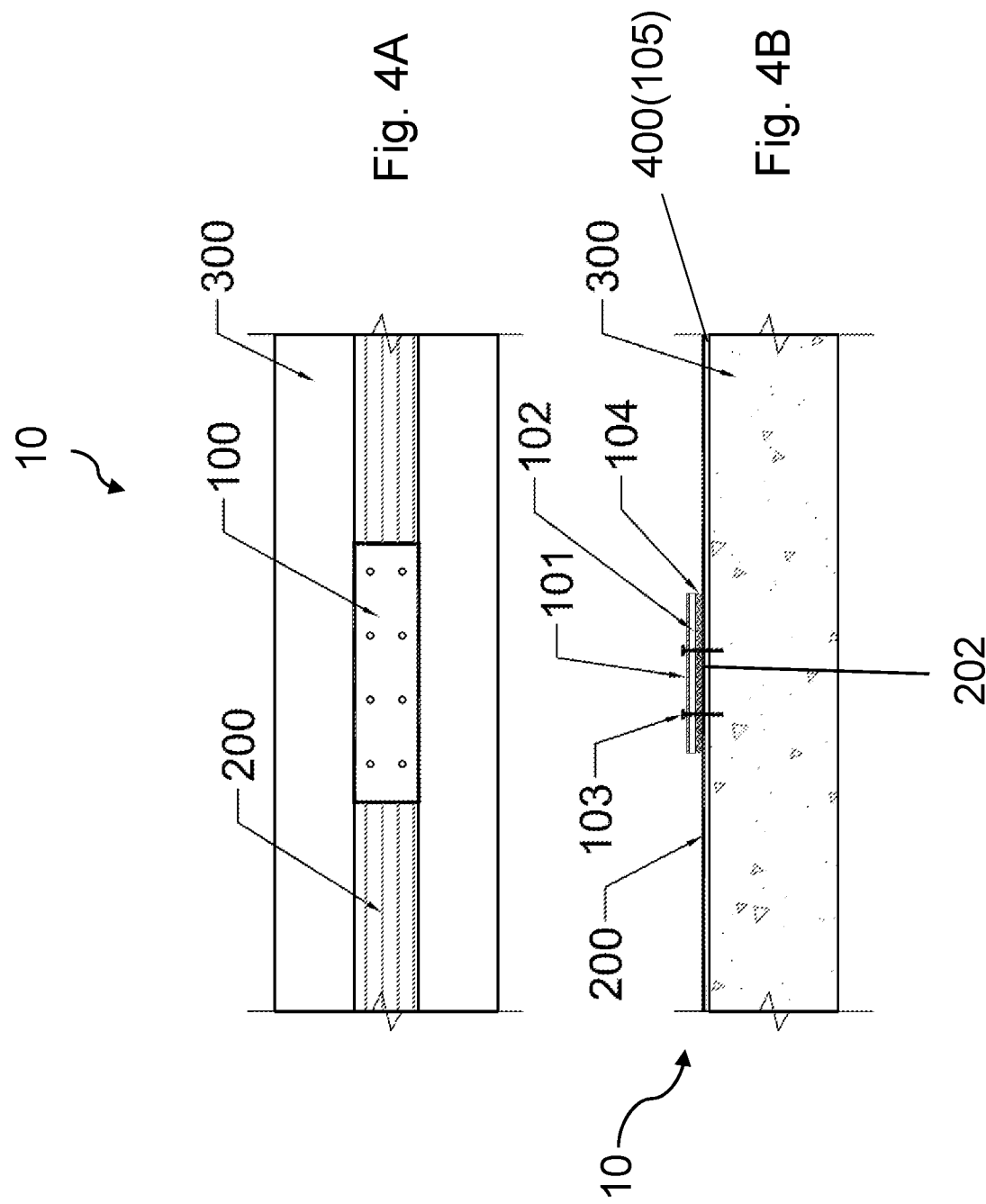

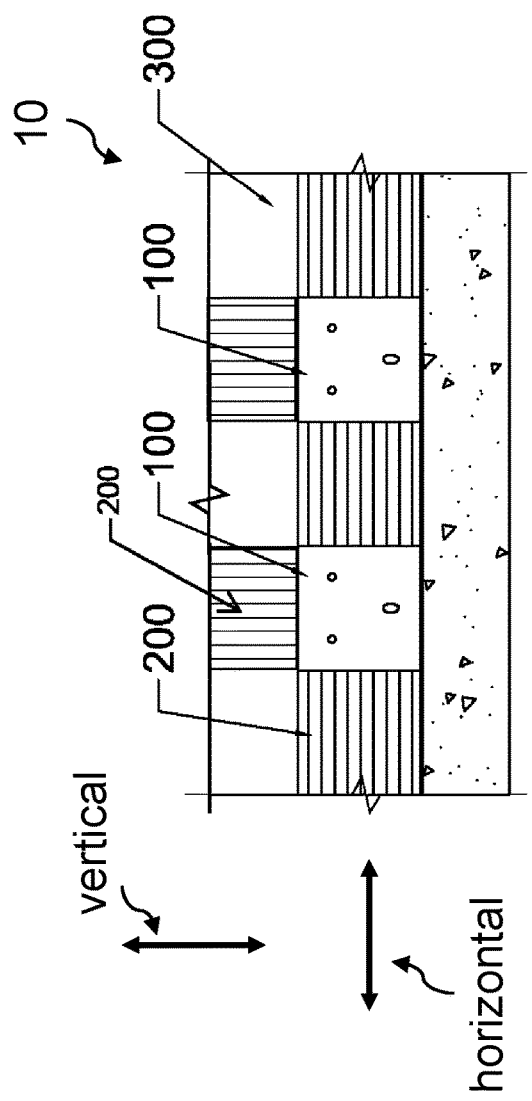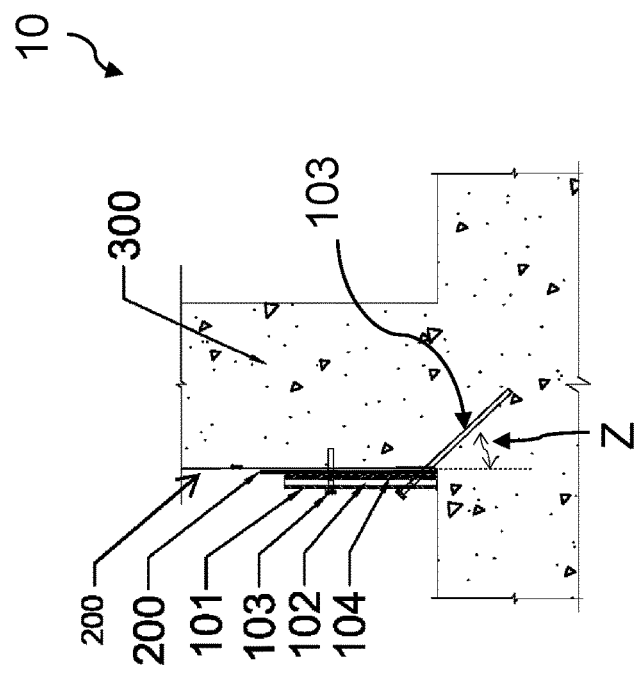

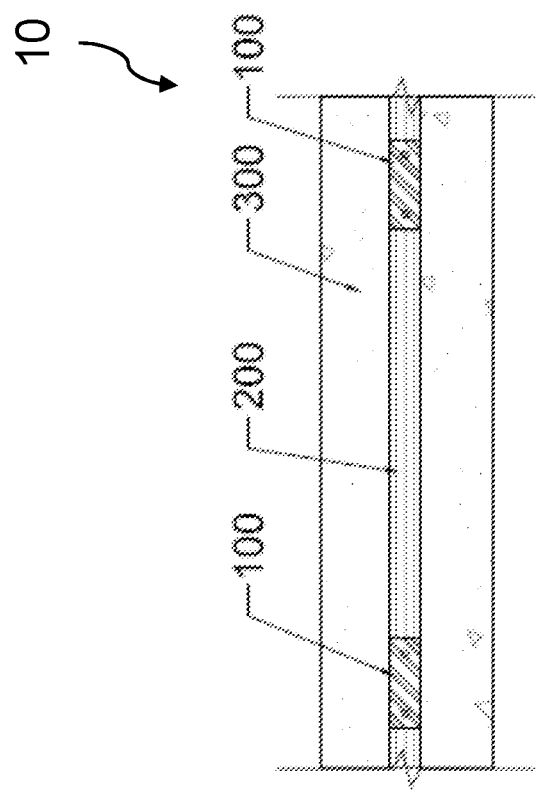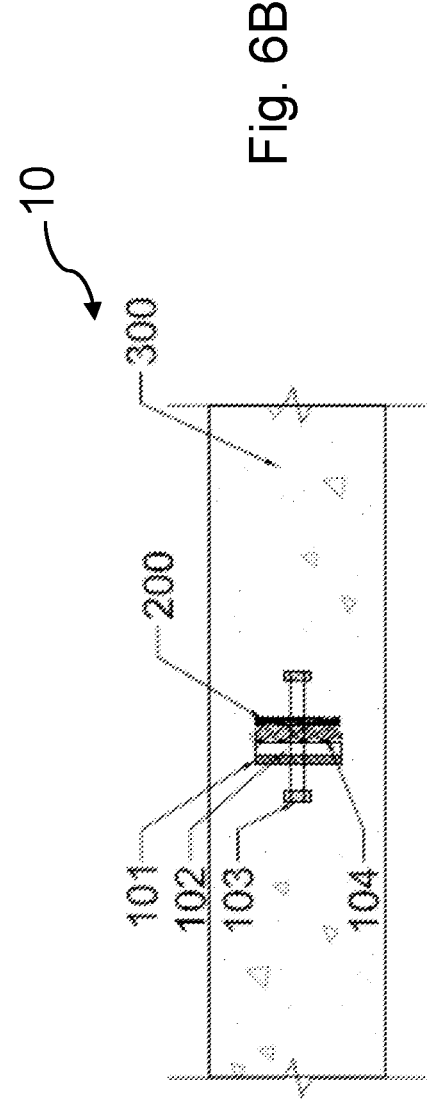

FIBER-REINFORCED POLYMER ANCHORING SYSTEM

CROSS-REFERENCE TO RELATED APPLICATIONS

This application also contains subject matter similar to that disclosed in the previously filed U.S. Provisional patent application entitled "COMPOSITE STRUCTURAL REINFORCEMENT DEVICE & ANCHORAGE SYSTEM," which is hereby expressly incorporated by reference as part of the present disclosure.

Although incorporated by reference in its entirety, no arguments or disclaimers made in the related application apply to this application. Any disclaimer that may have and occurred or might occur during the prosecution of the above-referenced application is hereby expressly rescinded.

FIELD OF THE DISCLOSURE

The present disclosure generally pertains to retrofit reinforcing systems. More particularly, this application is directed toward a fiber-reinforced polymer system and a method of anchoring them to structural elements.

BACKGROUND OF THE DISCLOSURE

Older buildings/structures were typically built according to outdated codes and specifications and may no longer have adequate capacity to meet current needs, uses, or environmental factors. For example, older buildings built of concrete can be found not to have enough rebar therewithin to meet current code requirements. Retrofit reinforcing systems can be used on structures to bring the structures up to code.

All referenced patents, applications, and literatures are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a fiber-reinforced polymer anchoring system for a structural element may comprise a fiber-reinforced polymer member configured to provide external tensile reinforcement to the structural element; an anchoring device coupled with the fiber-reinforced polymer member and the structural element, wherein the anchoring device comprises a metallic layer, a fiber-reinforced polymer layer, and fastening means for securing the anchoring device on the fiber-reinforced polymer member and the structural element.

In another aspect combinable with the general implementation, the fiber-reinforced polymer member may be located between the anchoring device and the structural element.

Among the many possible implementations of the fiber-reinforced polymer anchoring system, wherein the fiber-reinforced polymer member may be attached to the structural element.

Further, it is contemplated that the fiber-reinforced polymer member may not be attached to the structural element.

In the alternative, the fiber-reinforced polymer layer may be attached to the metallic layer.

It is still further contemplated that the fiber-reinforced polymer layer may be attached to the fiber-reinforced polymer member through an adhesive layer.

In one embodiment, the fastenings means for securing the anchoring device on the fiber-reinforced polymer member and the structural element may be passed through the fiber-reinforced polymer member and the structural element to affix the fiber-reinforced polymer member with the structural element.

In another aspect combinable with the general implementation, the fastening means for securing the anchoring device on the fiber-reinforced polymer member and the structural element may be passed through the metallic layer and a fiber-reinforced polymer layer.

In another aspect combinable with the general implementation, the anchoring device may be coupled on a termination end of the fiber-reinforced polymer member.

In another aspect combinable with the general implementation, the anchoring device may be coupled on a middle portion of the fiber-reinforced polymer member.

In another aspect combinable with the general implementation, the fiber-reinforced polymer member may comprise a middle portion located between two termination ends of the reinforced polymer member.

In another aspect combinable with the general implementation, the fiber-reinforced polymer member may comprise at least one termination end formed adjacent to a periphery of the fiber-reinforced polymer member.

In another aspect combinable with the general implementation, the fiber-reinforced polymer anchoring system may further comprise multiple anchoring devices, wherein each of the anchoring devices is spacedly arranged and coupled on the fiber-reinforced polymer member.

In another aspect combinable with the general implementation, the fastening means for securing the anchoring device on the fiber-reinforced polymer member and the structural element may be inclinedly passed through the fiber-reinforced polymer member and the structural element.

In another aspect combinable with the general implementation, the fastening means for securing the anchoring device on the fiber-reinforced polymer member and the structural element may be vertically passed through the fiber-reinforced polymer member and the structural element.

In another aspect combinable with the general implementation, the fiber-reinforced polymer layer may comprise strength-to-weight ratio materials.

In another aspect combinable with the general implementation, the fiber-reinforced polymer member may be embedded inside the structural element.

In another aspect combinable with the general implementation, the anchoring device may be embedded inside the structural element.

In another aspect combinable with the general implementation, the fiber-reinforced polymer anchoring system may further comprise a plurality of anchoring devices coupled with a plurality of fiber-reinforced polymer members embedded inside the structural element.

In another aspect combinable with the general implementation, each anchoring device may be spacedly arranged with each other.

While this specification contains many specific implementation details, these should not be construed as limitations on the scope of any inventions or of what may be claimed but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIGS. 1A to 1B are top and side views of a fiber-reinforced polymer anchoring system according to an aspect of the embodiment.

FIGS. 4A to 4B are top and side views of the fiber-reinforced polymer anchoring system according to an aspect of the embodiment.

FIGS. 5A to 5B are top and cross-sectional views of the fiber-reinforced polymer anchoring system according to an aspect of the embodiment.

FIGS. 6A to 6B are top and cross-sectional views of the fiber-reinforced polymer anchoring system according to an aspect of the embodiment.

DETAILED DESCRIPTION OF THE EMBODIMENTS

Figure 2:
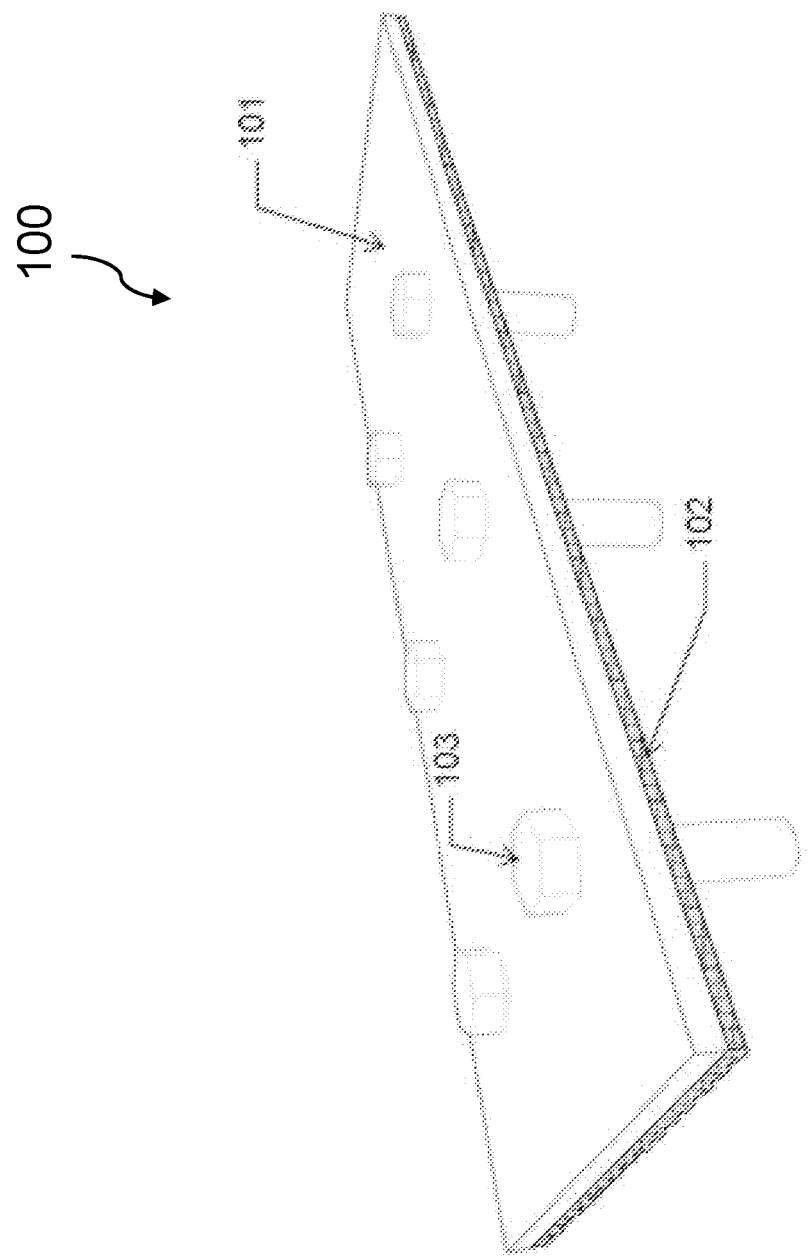
FIG. 2 is a perspective view of an anchoring device of the fiber-reinforced polymer anchoring system according to an aspect of the embodiment.

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

A "termination end" of the fiber-reinforced polymer member, as used herein, refers to the external boundary of the fiber-reinforced polymer member of the invention.

FIGS. 1A to 1B generally depict views of a fiber-reinforced polymer anchoring system according to an embodiment.

Referring to FIGS. 1A to 1B, the fiber-reinforced polymer anchoring system 10 may be adapted for a structural element 300. In one embodiment, the fiber-reinforced polymer anchoring system 10 may comprise a fiber-reinforced polymer member 200 which may be configured to provide external tensile reinforcement to the structural element 300.

For example, in still one embodiment, the fiber-reinforced polymer member 200 may be a retrofit system to the structural element 300 while the structural element 300 may be not satisfied the necessary strength requirements. For another example, the fiber-reinforced polymer member 200 may be prefabricated, fabricated in place, or a mixture of prefabricated and fabricated in place.

As shown in further detail in FIGS. 1A to 1B, the fiber-reinforced polymer member 200 may comprise an anchoring device 100 coupled with the fiber-reinforced polymer member 200 and the structural element 300. In one embodiment, the fiber-reinforced polymer member 200 may be located between the anchoring device 100 and the structural element 300.

In still one embodiment, the fiber-reinforced polymer member 200 may be attached to the structural element 300, wherein the anchoring device 100 may be coupled on the fiber-reinforced polymer member 200 with the structural element 300. It should be noted that, in still one embodiment, the fiber-reinforced polymer member 200 may comprise at least one termination end 201 formed adjacent to a periphery of the fiber-reinforced polymer member 200, wherein the anchoring device 100 may be coupled on the termination end 201 of the fiber-reinforced polymer member 200.

Continuing to FIGS. 1A to 1B, the fiber-reinforced polymer member 200 may be attached to the structural element 300 via adhesion 400 to the exposed surfaces. For example, the adhesion 400 may be epoxy or glues used in the construction industry. It should be noted that such connection can be adjusted based on design requirements and therefore the anchoring device 100 may be used to supply the load transfer between the fiber-reinforced polymer member 200 and the structural member 300.

Accordingly, the fiber-reinforced polymer member 200 may comprise fiber reinforced polymer materials. In some embodiments, the fiber reinforced polymer materials may be a high strength-to-weight ratio material, such as carbon fiber. It should be noted that using a high strength-to-weight ratio material may reduce the weight of the anchoring device 100 when comparing using a pure metal sheet/plate. Carbon fibers have several superior material properties suitable for construction or building a structure, including high stiffness, high tensile strength, high strength-to-weight ratio, high chemical resistance, high temperature tolerance, and low thermal expansion. Any other materials that are not purely single metal sheets/plates are within the scope of the present disclosure. For example, carbon fibers combined with other materials to form a composite material are some selected embodiments of the present disclosure. Other materials include polymers, such as natural polymeric and synthetic materials. In some embodiments, the natural polymeric materials include hemp, shellac, amber, wool, silk, cellulose, and natural rubber. In some embodiments, the synthetic materials include polyethylene, polypropylene, polystyrene, polyvinyl chloride, synthetic rubber, phenol formaldehyde resin, neoprene, nylon, polyacrylonitrile, PVB, GFRP, and silicone. For succinctness, all other polymeric materials and composite materials are within the scope of the disclosure so long as such material has a different weight than a single metal steel sheet/plate while is able to provide needed material property for the purpose of reinforcing the strength of a structural element including elasticity, toughness, viscoelasticity and other material properties as mentioned above.

It should be understood that the above-described fiber-reinforced polymer materials are exemplary, and any other fiber-reinforced polymer materials can be adopted in various embodiments of this disclosure.

FIG. 2 generally depicts a view of the anchoring device 100 of the fiber-reinforced polymer anchoring system according to an embodiment.

Referring to FIG. 2, the anchoring device 100 may comprise a metallic layer 101, a fiber-reinforced polymer layer 102, and a fastener/fastening means 103 for securing the anchoring device 100 on the fiber-reinforced polymer member 200 and the structural element 300 (as shown in FIGS. 1A to 1B). In one embodiment, the fiber-reinforced polymer layer 102 may be attached to the metallic layer 101, wherein the fastening means 103 may be passed through the metallic layer 101 and the fiber-reinforced polymer layer 102. In some embodiments, the fiber-reinforced polymer layer 102 may be located between the metallic layer 101 and the fiber-reinforced polymer member 200. In some embodiments, the fiber-reinforced polymer layer 102 may be directly contacted with the metallic layer 101.

In some embodiments, the anchoring device 100 may comprise a plurality of the fastening means 103, wherein the fastening means 103 may be spacedly arranged with each other.

In some embodiments, the anchoring device 100 may be prefabricated through a manufacturing process before bringing it onsite for use/installation (such pre-fabrication stage/process includes the metallic layers 101 and/or the fiber-reinforced polymer layer 102). By the pre-fabrication of the anchoring device 100, it allows a user, to bypass additional installation methods/steps and avoid inconsistent layering and/or installation methods. For example, in still some embodiments, the anchoring device 100 may comprise a metal or steel plate/sheet for the metallic layer 101 and the fiber-reinforced polymer materials for the fiber-reinforced polymer layer 102. In still some embodiments, the metallic layer 101 may comprise a thin steel sheet/plate, such as a light gauge steel strip, and may be utilized for its properties relating to a fine finish, lightweight, ductility, high tensile and yield strength, and ability to maintain its form without shrinkage or changing form or appearance. In some embodiments, the anchoring device 100 may be prefabricated using an extrusion, mold shaping, roller pressing, and any other manufacturing processes so that the anchoring device 100 is in a ready-to-use status before it is transported to the construction sites.

It should be understood that the above-described prefabricating processes are exemplary, and any other prefabricating processes can be adopted in various embodiments of this disclosure.

In some embodiments, the anchoring device 100 may be manufactured in any pre-determined shapes and sizes, such as rectangular, triangular, or circular pieces or strips, and with dimensions in the range of at least approximately 2 inches to 24 inches in width and at least approximately 4 inches to 60 inches in length. In some embodiments, the anchoring device 100 may be structured to have a size and weight that can be rapidly moved to a structural enhancing location/spot by a typical construction worker with one hand, so that the anchoring device 100 may be, in general, less than 5000 g (e.g., 5 g, 10 g, 100 g-200 g).

Figure 3A:
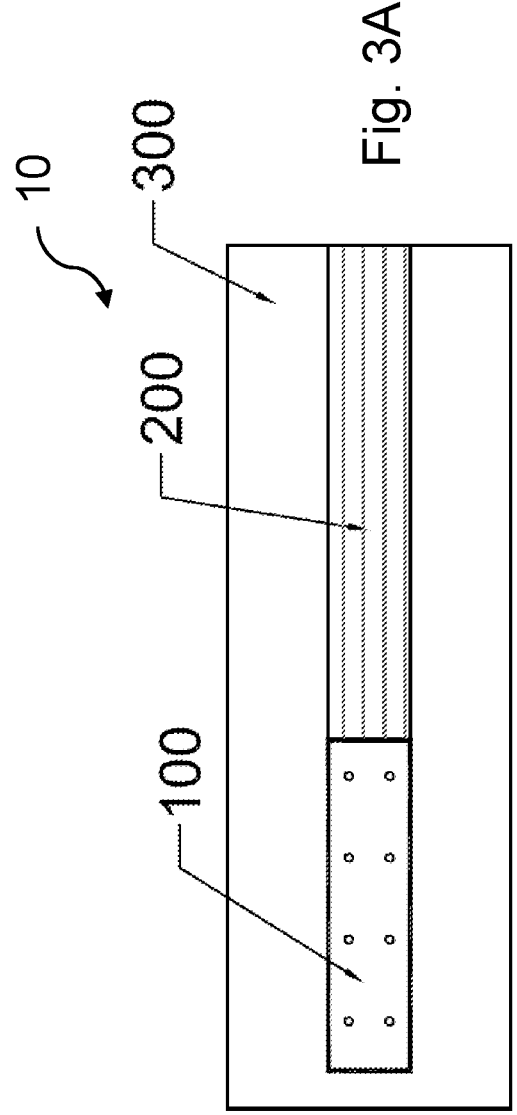
FIGS. 3A to 3B are top and side views of the fiber-reinforced polymer anchoring system according to an aspect of the embodiment.
Figure 3B:
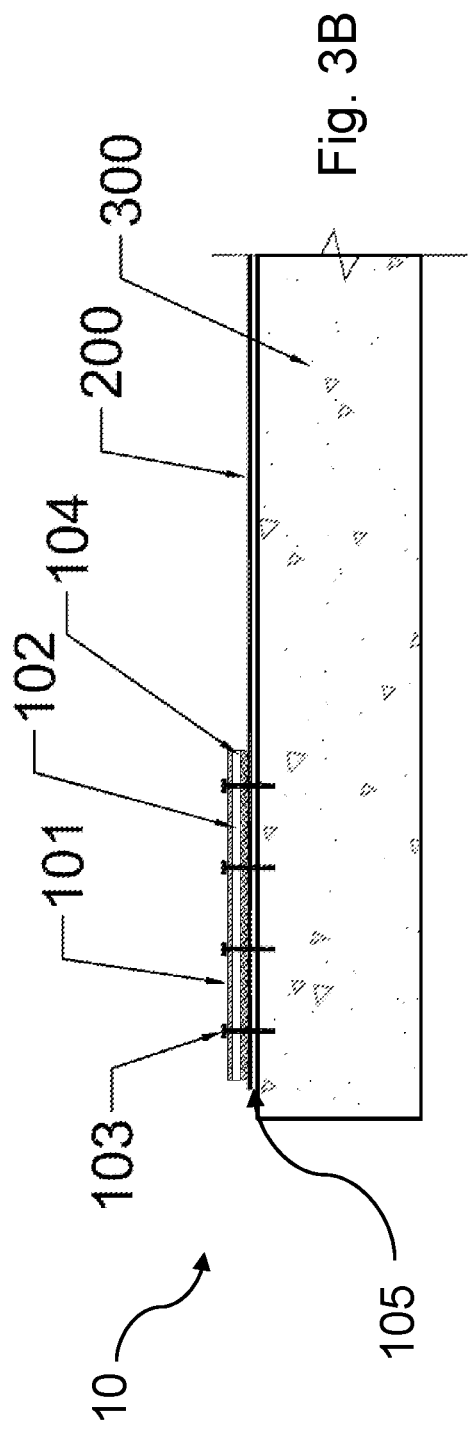

FIGS. 3A to 3B generally depict views of the fiber-reinforced polymer anchoring system 10 according to an embodiment.

In one embodiment, the fiber-reinforced polymer member 200 may not be contacted/attached to the structural element 300. As shown in further details of FIGS. 3A to 3B, the fiber-reinforced polymer anchoring system 10 may comprise a gap 105 formed between the fiber-reinforced polymer member 200 and the structural element 300.

Continuing to FIGS. 3A to 3B, the fiber-reinforced polymer layer 102 may be coupled with the fiber-reinforced polymer member 200 via an adhesive layer 104. As shown in further detail in FIGS. 3A to 3B, the fiber-reinforced polymer member 200 may not be connected with the structural element 300 while the fastening means 103 may be passed through the metallic layer 101, the fiber-reinforced polymer layer 102, the adhesive layer 104, the fiber-reinforced polymer member 200, the gap 105, and the structural element 300, and in such a manner, the fiber-reinforced polymer member 200 may be affixed on the structural element 300 through the anchoring device 100.

Accordingly, referring to FIGS. 1A to 1B, the fiber-reinforced polymer layer 102 may be coupled with the fiber-reinforced polymer member 200 via the adhesive layer 104. As shown in further detail in FIGS. 1A to 1B, the fiber-reinforced polymer member 200 may be directly contacted with the structural element 300 while the fastening means 103 may be passed through the metallic layer 101, the fiber-reinforced polymer layer 102, the adhesive layer 104, the fiber-reinforced polymer member 200, the adhesion 400, and the structural element 300, and in such a manner, the fiber-reinforced polymer member 200 may be affixed on the structural element 300 through the anchoring device 100.

It should be noted that, in some embodiments, the fastening means 103 may comprise bolts, rivets, anchors, screws, pegs, power-actuated fasteners, clamps, staples, wedge anchors, or nails. It should be understood that the above-described fastening means are exemplary and any other fastening means can be adopted in various embodiments of this disclosure.

FIGS. 4A to 4B generally depict views of the fiber-reinforced polymer anchoring system 10 according to an embodiment.

In some embodiments, the anchoring device 100 may be coupled on a middle portion 202 of the fiber-reinforced polymer member 200. In some embodiments, the fiber-reinforced polymer member 200 may comprise a middle portion 202 which bisects the reinforced polymer member 200. In some embodiments, the fiber-reinforced polymer member 200 may comprise the middle portion 200 located between two termination ends 201 of the fiber-reinforced polymer member 200 (as shown in FIG. 1B).

In one embodiment, while the anchoring device 100 is coupled on the middle portion 202 of the fiber-reinforced polymer member 200, the fiber-reinforced polymer layer 102 may be coupled with the fiber reinforced polymer member 200 via the adhesive layer 104. The fiber-reinforced polymer member 200 may not be directly contacted/attached to the structural element 300. In such a manner, the fiber-reinforced polymer anchoring system 10 may comprise the gap 105 formed between the fiber-reinforced polymer member 200 and the structural element 300 (as shown in FIG. 3B). The fastening means 103 may be passed through the metallic layer 101, the fiber-reinforced polymer layer 102, the adhesive layer 104, the fiber-reinforced polymer member 200, the gap 105 and the structural element 300, and in such a way, the fiber-reinforced polymer member 200 may be affixed on the structural element 300 through the anchoring device 100.

In another embodiment, while the anchoring device 100 is coupled on the middle portion 202 of the fiber-reinforced polymer member 200, the fiber-reinforced polymer layer 102 may be coupled with the fiber-reinforced polymer member 200 via the adhesive layer 104. In such a manner, the fiber-reinforced polymer member 200 may be contacted with the structural element 300 through the adhesion 400 (as shown in FIG. 3B). In one embodiment, the fastening means 103 may be passed through the metallic layer 101, the fiber-reinforced polymer layer 102, the adhesive layer 104, the fiber-reinforced polymer member 200, the adhesion 400 and the structural element 300, and so that, the fiber-reinforced polymer member 200 may be affixed on the structural element 300 through the anchoring device 100.

FIGS. 5A to 5B generally depict views of the fiber-reinforced polymer anchoring system 10 according to an embodiment.

In some embodiments, according to all of the embodiments mentioned above, the anchoring device 100 may be used in a singular arrangement, or in the exemplary embodiment, with a plurality of anchoring devices 100 in a strategically placed configuration to anchor the full width of the reinforcement layer. The anchoring device 100 can provide anchorage for externally applied tensile reinforcement systems used in the retrofit of structures when traditional bonding does not provide the required load transfer.

As shown in further detail in FIG. 5A, according to all of the embodiments mentioned above, the fiber-reinforced polymer anchoring system 10 may comprise multiple anchoring devices 100, wherein each of the anchoring devices 100 may be spacedly arranged and coupled on the fiber-reinforced polymer member 200. In some embodiments, the anchoring devices 100 may be arranged in series.

Continuing to FIG. 5B, according to the above-mentioned embodiment, the fastening means 103 may be vertically passed through the fiber-reinforced polymer member 200 and the structural element 300. In this manner, in some embodiments, the fastening means 103 may be passed through the metallic layer 101 and the fiber-reinforced polymer layer 102 to form the anchoring device 100, and the fastening means 103 may also be passed through the adhesive layer 104, the fiber-reinforced polymer member 200, and the structural element 300, and in such a way, the fiber-reinforced polymer member 200 may be affixed on the structural element 300 through the anchoring device 100. In some embodiments, the fastening means 103 may be vertically passed through the fiber-reinforced polymer 200 and the structural element 300 to form a right angle, wherein the right angle is formed between the fiber-reinforced polymer member 200 and the structural element 300.

As shown in further detail in FIG. 5B, according to the above-mentioned embodiment, the fastening means 103 may be inclinedly passed through the fiber-reinforced polymer member 200 and the structural element 300 to form an angle "Z". In this manner, in some embodiments, the fastening means 103 may be inclinedly passed through the metallic layer 101 and the fiber-reinforced polymer layer 102 to form the angle "Z", and the fastening means 103 may also be inclinedly passed through the adhesive layer 104, the fiber-reinforced polymer member 200, and the structural element 300 to form the angle "Z", and in such a way, the fiber-reinforced polymer member 200 may be affixed on the structural element 300 through the anchoring device 100.

It should be noted that, in some embodiments, the fastening means 103 may be installed straightly or to form an angle to deliver anchorage to an immediate structural element 300 or as an angle to transfer anchorage loads to the adjacent structural element (i.e., a connection between a wall and foundation, wall/slab, wall/intersecting wall, or wall/column). In some embodiments, the angle "Z" may be 30 degrees, 45 degrees, or 60 degrees.

It should be understood that the above-described angles are exemplary and any other angles can be adopted in various embodiments of this disclosure.

It should be noted that, in some embodiments, the fastening means 103 may be installed straightly or to form the angle "Z" to deliver anchorage to an immediate structural element 300 or as an angle to transfer anchorage loads to the adjacent structural element (i.e., a connection between a wall and foundation, wall/slab, wall/intersecting wall, or wall/column).

In some embodiments, continuing to FIGS. 5A to 5B, the fiber-reinforced polymer member 200 may be horizontally attached to the structural element 300, wherein the fastening means 103 of the anchoring devices 100 may be passed through the fiber-reinforced polymer member 200 and the structural element 300 to affix the fiber-reinforced polymer member 200 to the structural element 300. In other embodiments, the fiber-reinforced polymer member 200 may be vertically attached to the structural element 300, wherein the fastening means 103 of the anchoring devices 100 may be passed through the fiber-reinforced polymer member 200 and the structural element 300 to affix the fiber-reinforced polymer member 200 to the structural element 300. The vertically-arranged fiber-reinforced polymer member 200 and the horizontally-arranged fiber-reinforced polymer member 200 may be overlappingly arranged between the fiber-reinforced polymer layer 102 and the structural element 300. For example, the vertically-arranged fiber-reinforced polymer 200 and the horizontally-arranged fiber-reinforced polymer member 200 may be overlappingly arranged to form a cross-shaped configuration. In other words, in some embodiments, the vertically-arranged fiber-reinforced polymer member 200 and the horizontally-arranged fiber-reinforced polymer member 200 may be sandwiched between the fiber-reinforced polymer layer 102 and the structural element 300. In still some embodiments, the vertically-arranged fiber-reinforced polymer 200 may be directly contacted with the structural element 300. In still some embodiments, the horizontally-arranged fiber-reinforced polymer member 200 may be directly contacted with the adhesive layer 104 and the adhesive layer 104 may be directly contacted with the fiber-reinforced polymer layer 102, and in other words, the horizontally-arranged fiber-reinforced polymer member 200 may be affixed with the fiber-reinforced polymer layer 102 via the adhesive layer 104. In still some embodiments, the vertically-arranged fiber-reinforced polymer member 200 and the horizontally-arranged fiber-reinforced polymer member 200 may be not contacted with each other to form a distance gap.

FIGS. 6A to 6B generally depict views of the fiber-reinforced polymer anchoring system according to an embodiment.

As shown in further details on FIGS. 6A-6B, the fiber-reinforced polymer anchoring system 10 may comprise at least two anchoring devices 100, wherein each of the anchoring devices 100 may be spacedly arranged and coupled on the fiber-reinforced polymer member 200. In some embodiments, the anchoring devices 100 may be arranged in series. In another embodiment, the anchoring devices 100 coupled with the fiber-reinforced polymer member 200 may be embedded inside the structural element 300.

It should be noted that, in some embodiments, the fiber-reinforced polymer member 200 may be attached to the structural element 300 through the fastening means 103 of the anchoring devices 100, and in such a way, the fiber-reinforced polymer member 200 may act as internal reinforcement to the structural element 300 with the anchoring device 100 being utilized to support the load transfer between the fiber-reinforced polymer member 200 and the structural element 300.

Continuing to FIG. 6A, the fiber-reinforced polymer anchoring system 10 may comprise a plurality of anchoring devices 100 coupled with a plurality of fiber-reinforced polymer members 200 and embedded inside the structural element 300. In some embodiments, each of the anchoring devices 100 may be spacedly arranged with each other.

According to the above-mentioned embodiments, the fiber-reinforced polymer layer 102 may comprise fiber reinforced polymer materials. In some embodiments, the fiber reinforced polymer materials may be a high strength-to-weight ratio material, such as carbon fiber. It should be noted that using a high strength-to-weight ratio material may reduce the weight of the anchoring device 100 when comparing using a pure metal sheet/plate. Carbon fibers have several superior material properties suitable for construction or building a structure including high stiffness, high tensile strength, high strength-to-weight ratio, high chemical resistance, high temperature tolerance, and low thermal expansion. Any other materials that are not purely single metal sheets/plates are within the scope of the present disclosure. For example, carbon fibers combined with other materials to form a composite material are some selected embodiments of the present disclosure. Other materials include polymers, such as natural polymeric and synthetic materials. In some embodiments, the natural polymeric materials include hemp, shellac, amber, wool, silk, cellulose, and natural rubber. In some embodiments, the synthetic materials include polyethylene, polypropylene, polystyrene, polyvinyl chloride, synthetic rubber, phenol formaldehyde resin, neoprene, nylon, polyacrylonitrile, PVB, GFRP, and silicone. For succinctness, all other polymeric materials and composite materials are within the scope of the disclosure so long as such material has a different weight than a single metal steel sheet/plate while may be able to provide needed material property for the purpose of reinforcing the strength of a structural element including elasticity, toughness, viscoelasticity and other material properties as mentioned above.

It should be understood that the above-described fiber-reinforced polymer materials are exemplary and any other fiber-reinforced polymer materials can be adopted in various embodiments of this disclosure.

According to the above-mentioned embodiments, the structural element 300 may be a made of reinforced concrete and can represent structural elements such as a beam, wall, slab, or column. For example, the structural element 300 may be made of concrete, steel, masonry, wood, or other building materials used in structures.

It should be understood that the above-described structural elements 300 are exemplary and any other structural element 300 can be adopted in various embodiments of this disclosure.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of the fiber-reinforced polymer anchoring system have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements that are set forth but all equivalent structures, material, or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:

1. A fiber-reinforced polymer anchoring system for a structural element, comprising:
   a fiber-reinforced polymer member configured to provide external tensile reinforcement and communicated with the structural element;
   an anchoring device coupled with the fiber-reinforced polymer member and the structural element; wherein
   the anchoring device comprises a metallic layer, a fiber-reinforced polymer layer, and fastening means for securing the anchoring device on the fiber-reinforced polymer member and the structural element.

2. The fiber-reinforced polymer anchoring system of claim 1, wherein the fiber-reinforced polymer member is located between the metallic layer and the structural element.

3. The fiber-reinforced polymer anchoring system of claim 1, wherein the fiber-reinforced polymer member is directly contacted to the structural element.

4. The fiber-reinforced polymer anchoring system of claim 1, wherein the fiber-reinforced polymer member is not connected to the structural element to form a gap.

5. The fiber-reinforced polymer anchoring system of claim 1, wherein the fiber-reinforced polymer layer is directly contacted with the metallic layer and located between the metallic layer and the fiber-reinforced polymer member.

6. The fiber-reinforced polymer anchoring system of claim 1, wherein the fiber-reinforced polymer layer is attached to the fiber-reinforced polymer member through an adhesive layer.

7. The fiber-reinforced polymer anchoring system of claim 1, wherein the fastening means for securing the anchoring device on the fiber-reinforced polymer member and the structural element is passed through the fiber-reinforced polymer member and the structural element to affix the fiber-reinforced polymer member on the structural element.

8. The fiber-reinforced polymer anchoring system of claim 1, wherein the fastening means for securing the anchoring device on the fiber-reinforced polymer member and the structural element is passed through the metallic layer and the fiber-reinforced polymer layer.

9. The fiber-reinforced polymer anchoring system of claim 1, wherein the anchoring device is coupled on a termination end of the fiber-reinforced polymer member.

10. The fiber-reinforced polymer anchoring system of claim 1, wherein the anchoring device is coupled on a middle portion of the fiber-reinforced polymer member.

11. The fiber-reinforced polymer anchoring system of claim 1, wherein the fiber-reinforced polymer member comprises a middle portion formed between two termination ends of the fiber-reinforced polymer member.

12. The fiber-reinforced polymer anchoring system of claim 1, wherein the fiber-reinforced polymer member comprises at least one termination end formed adjacent to a periphery of the fiber-reinforced polymer member.

13. The fiber-reinforced polymer anchoring system of claim 1, further comprising multiple anchoring devices, wherein each of the anchoring devices is spacedly arranged and coupled on the fiber-reinforced polymer member.

14. The fiber-reinforced polymer anchoring system of claim 1, wherein the fastening means for securing the anchoring device on the fiber-reinforced polymer member and the structural element is inclinedly passed through the fiber-reinforced polymer member and the structural element to form an acute angle between the structural element and the fiber-reinforced polymer member.

15. The fiber-reinforced polymer anchoring system of claim 1, wherein the fastening means for securing the anchoring device on the fiber-reinforced polymer member and the structural element is vertically passed through the fiber-reinforced polymer member and the structural element.

16. The fiber-reinforced polymer anchoring system of claim 1, wherein the fiber-reinforced polymer layer comprises strength-to-weight ratio materials.

17. The fiber-reinforced polymer anchoring system of claim 1, wherein the fiber-reinforced polymer member is embedded inside the structural element.

18. The fiber-reinforced polymer anchoring system of claim 1, wherein the anchoring device is embedded inside the structural element.

19. The fiber-reinforced polymer anchoring system of claim 1, further comprising a plurality of anchoring devices coupled with a plurality of fiber-reinforced polymer members and embedded inside the structural element.

20. The fiber-reinforced polymer anchoring system of claim 19, wherein each of the anchoring devices is spacedly arranged with each other.

* * * * *